Oct. 13, 1936.   R. R. McKECHNIE, JR   2,057,535
FISHING ROD HANDLE
Filed June 7, 1935
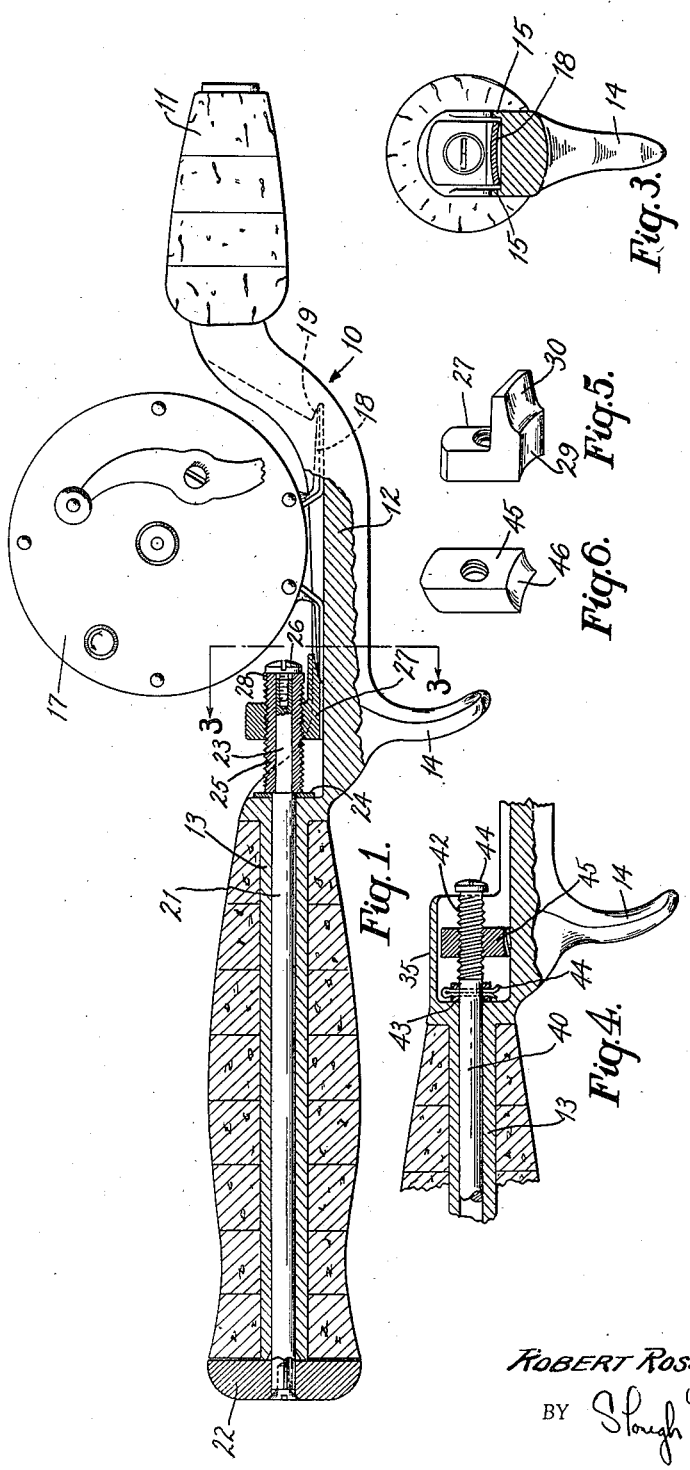
INVENTOR.
ROBERT ROSS McKECHNIE, JR.
BY Slough and Canfield
His ATTORNEYS.

Patented Oct. 13, 1936

2,057,535

UNITED STATES PATENT OFFICE 2,057,535

FISHING ROD HANDLE

Robert Ross McKechnie, Jr., Madison, Ohio, assignor to The American Fork & Hoe Company, Cleveland, Ohio, a corporation of Ohio Application June 7, 1935, Serial No. 25,462

5 Claims. (Cl. 43—22)

This invention relates to fishing rod handles, and relates more particularly to an improved and novel means for detachably mounting a reel thereon.

Prior fishing rod handles of this type with which I am familiar have generally disposed the means for operating the reel clamping parts at or closely adjacent the reel seat, and due to the limited space with the reel in position, it was relatively difficult to operate the clamping means for securing or detaching the reel.

I am also familiar with a patent to John S. Burdick, Patent No. 1,994,449, wherein means are disposed rearwardly of the hand grip portion of the handle for actuating a reel base engaging element at the reel seat portion of the handle. However, since the reel base engaging element is freely rotatable, it is not well adapted to prevent lateral shifting of the reel base. Additionally, since the actuating means is movable axially relative to the hand grip portion, it must necessarily project rearwardly of the hand grip portion and during use of the rod might become entangled with the line, the clothing of the user or the like.

I have devised a fishing rod handle somewhat similar to the aforementioned Burdick handle but wherein the reel base engaging element is non-rotatable and is well adapted to prevent lateral shifting of the reel base, and the actuating means for the reel base engaging element is not movable axially of the hand grip portion and at all times will conform to the contour of the rear portion of the hand grip thereby eliminating any portion which might become entangled with the line or the clothing of the user.

It is a primary object of my invention, therefore, to provide an improved reel clamping handle for fishing rods whereby the reel may be easily and detachably secured thereto.

Another object of my invention is to provide an improved reel clamping handle for fishing rods wherein the reel clamping means is easily accessible and has a positive locking action.

Another object of my invention is to provide an improved reel clamping handle for fishing rods which is of rugged construction and which can be economically manufactured primarily by machine-screw operations.

Another object of my invention is to provide an improved reel clamping handle for fishing rods wherein the reel clamping means may be quickly and easily assembled and disassembled.

These and other objects of the invention will become increasingly apparent from a consideration of the following description of the drawing, wherein:

Fig. 1 is an elevational view partially in medial section of a fishing rod handle embodying my invention, and showing a reel secured thereto;

Fig. 2 is a plan view of the handle illustrated in Fig. 1, with the reel omitted;

Fig. 3 is a transverse sectional view taken along the line 3—3 of Fig. 1;

Fig. 4 is a fragmentary view generally similar to Fig. 1, showing a modification of my invention;

Fig. 5 is a perspective view of the clamp element illustrated in Fig. 1; and

Fig. 6 is a perspective view of the clamp element illustrated in Fig. 4.

Referring now to the drawing, I have shown at 10 a reel support formed preferably of relatively light cast metal such has aluminum and comprising a socket 11 adapted to receive and non-rotatably secure therein the innermost end of a fishing rod, a depressed elongated reel seat 12, and a rearwardly disposed tubular portion 13 encased by any suitable material such as cork to form a hand grip.

The reel seat is preferably provided with a depending hook finger grip indicated at 14 whereby the rod may be more accurately controlled during use.

The reel seat 12 is preferably channel-shaped in cross-section, as indicated in Fig. 3, the upstanding lateral edges thereof 15—15 preferably flaring upwardly from the reel seat to merge at the forward end with the socket 11 and at the rear end of the reel seat with the tubular portion 13.

A conventional reel 17 provided with a reel base 18 generally rectangular in shape and preferably concavo-convex in transverse cross-section is adapted to be mounted upon the reel seat 12. The forward end of the reel base 18 is adapted to be received within a pocket 19 formed by undercutting the front wall of the reel seat. The top face of the pocket 19 is preferably inclined upwardly and outwardly so that the forward end of the reel base may be easily inserted therein.

The manner of clamping the reel base and maintaining the same on the reel seat will now be explained.

A cylindrical rod 21 provided with an enlarged head 22 at the rearward end and a relatively reduced square shank 23 at the forward end is projected through the tubular portion 13 with the head portion 22 abutting the rear face of the hand grip and conforming generally in contour thereto. A spacing washer 24 is telescoped over the forward cylindrical portion of rod 21 and is maintained thereon in abutting relation with the front plane face of tubular portion 13 by means of an externally threaded sleeve 25 provided with a square bore engaging shank 23 of rod 21 and maintained thereon by means of a screw 26 threaded into the shank end.

Prior to telescoping the sleeve 25 over the shank 23, a clamping element, generally indicated at 27, is threaded onto sleeve 25 and limited in outward movement by means of an enlarged shoulder portion 28 provided at the outer end of sleeve 25. The wedge or clamp element 27 is generally L-shaped with the bottom face of the element comprising a plane portion indicated at 29 maintained slightly spaced from and generally parallel to the surface of the reel seat, and the surface 29 preventing rotative movement of element 27 or cooperating with the side walls of the element which may engage the upstanding edges 15—15 of the reel seat to prevent such rotative movement.

Forwardly of the face 29 is an arcuate portion 30 adapted to wedgingly engage the reel base and which also may be of arcuate form in transverse cross-section conforming to the reel base whereby lateral shifting thereof will be prevented.

It will now be understood that the reel is secured on the reel seat by inserting the toe of the reel base within the pocket 19 and the clamping element 27 will be disposed sufficiently rearwardly to permit the heel of the reel base to engage the reel seat and by rotation of the head 22 rearwardly of the hand grip portion of the handle, the clamping element 27 will be forced axially of the rod 21 to clamp the reel base heel against the reel seat and maintain the same thereagainst.

It will be noted that the actuation of the clamping element 27, being effected by rotating the head 22 at the rear of the hand grip portion, provides an easily accessible means for securing the reel and since the head 22 substantially abuts the hand grip portion there is no surface presented which would easily become entangled with a line or the like. The clamping element 27, being non-rotatable, may engage the reel base over a relatively wide area and in a reel seat not providing a channel cross-section in itself prevents lateral shifting of the reel during use.

I have indicated in Fig. 4 a modification of my invention wherein I may employ a similar type of reel clamping means, but wherein a generally U-shaped protective housing, indicated at 35, encases the sleeve 25 and a clamping element 45 and minimizes any danger of these parts being injured when transporting the rod, etc.

The reel support 30 of the modification of Fig. 4, is generally similar to that previously described but a different form of clamping element and means for assembling the same with the actuating rod is employed. In this modification, a rod generally indicated at 40 is provided with a head (not shown) for manually rotating the rod and at the opposite or forward end is externally threaded as indicated at 42, the forward rod end also being provided with a short threaded bore adapted to receive a set screw or the like. The rod 40 is projected through the bore of the tubular portion 13 and is locked against axial movement relative thereto by means of a collar 43 adapted to be fixedly secured to the rod 40 by means of a cotter pin or the like 44 projected through aligned perforations in the rod and collar in a well known manner. A headed set screw 44, threaded in the forward end of the rod 40, limits longitudinal movement of the clamping element indicated at 45.

The clamping element 45 comprises a generally rectangular element having a lower face 46 curving forwardly and upwardly to engage the reel base and also preferably curved in transverse section to conform to the transverse contour of the reel base.

I contemplate that the clamping elements 46 and 27 may be interchanged, whereby the clamping element 46 may be used with the support means therefor, illustrated in Fig. 1, and the clamping element 27 may be employed with the support means illustrated in Fig. 4; and further that the support means of Fig. 1 may be employed with the protective housing type support of Fig. 4.

It will thus be seen that I have provided a positive clamp means which is easily accessible and operable for securing and detaching a reel to a reel support, which presents a considerable area of engagement with the reel base and which may be economically manufactured and assembled.

Although I have shown and described modifications of my invention, I contemplate that numerous and extensive departures may be made therefrom without departing from the spirit of my invention and within the scope of the appended claims.

Having thus described my invention, what I claim is:

1. A fishing rod handle comprising a reel support having a rod receiving socket at its forward end, a tubular hand grip at its rearward end, and an intermediate reel seat, and reel clamping means comprising a rotatable rod projected through the bore of the hand grip but restrained from axial movement relative thereto and having a portion extending rearwardly thereof whereby the rod may be rotated, and a non-rotatable reel base clamping element movable longitudinally of the handle by rotation of said rod.

2. A reel supporting handle provided with a rearwardly extending tubular hand grip element, clamping means to removably secure the base of a reel on the handle forwardly of the hand grip comprising a rotatable rod projected through the bore of said hand grip and rotatable by a head portion extending rearwardly of the hand grip and substantially abutting the rear face thereof, means preventing axial movement of the rod relative to the hand grip and a non-rotatable reel base clamping element mounted on a portion of said rod extending forwardly of the hand grip and movable axially thereof by rotating the rod, and means limiting the axial movement of said clamping element.

3. A reel supporting handle provided with a rearwardly extending tubular hand grip element, clamping means to removably secure the base of a reel on the handle forwardly of the hand grip comprising a rotatable rod projected through the bore of said hand grip and having a rearwardly extending manual gripping portion whereby the rod may be rotated and a threaded portion extending forwardly of the hand grip, a removable element associated with said rod preventing axial movement thereof relative to the hand grip, and a reel base clamping element engaging said threaded portion and movable axially of the rod to engage or disengage a reel base by rotating said rod.

4. A reel supporting handle provided with a rearwardly extending tubular hand grip element, clamping means to removably secure the base of a reel on the handle forwardly of the hand grip comprising a rotatable rod projected through the bore of said hand grip having an enlarged head portion abutting the rear face of the hand grip whereby the rod may be manually rotated and terminating at its opposite end in a shank portion extending forwardly of the hand grip, an externally threaded sleeve telescoped over the shank portion and fixedly secured thereto and adapted to prevent axial movement of the rod relative to the hand grip, and a clamp element threadedly engaging said sleeve having a lower face engageable with the reel base upon rotation of the rod and maintained in non-rotative relation relative to the reel seat.

5. A fishing rod handle comprising a reel support having a rod-receiving socket at its forward end, a tubular hand grip at its rear end and an intermediately disposed reel seat, the front face of the hand grip having a portion extending forwardly therefrom to form a housing with the reel seat, and reel clamping means operable from the rear exterior of the hand grip comprising a rotatable rod projecting through the bore of the tubular element rotatable from the rear of the hand grip and restrained from axial movement relative thereto, the forward portion of the rod comprising a threaded portion disposed within said housing, and a non-rotatable reel base clamping element threadedly engaging the rod threaded portion.

ROBERT ROSS McKECHNIE, Jr.